United States Patent Office 2,773,614
Patented Dec. 11, 1956

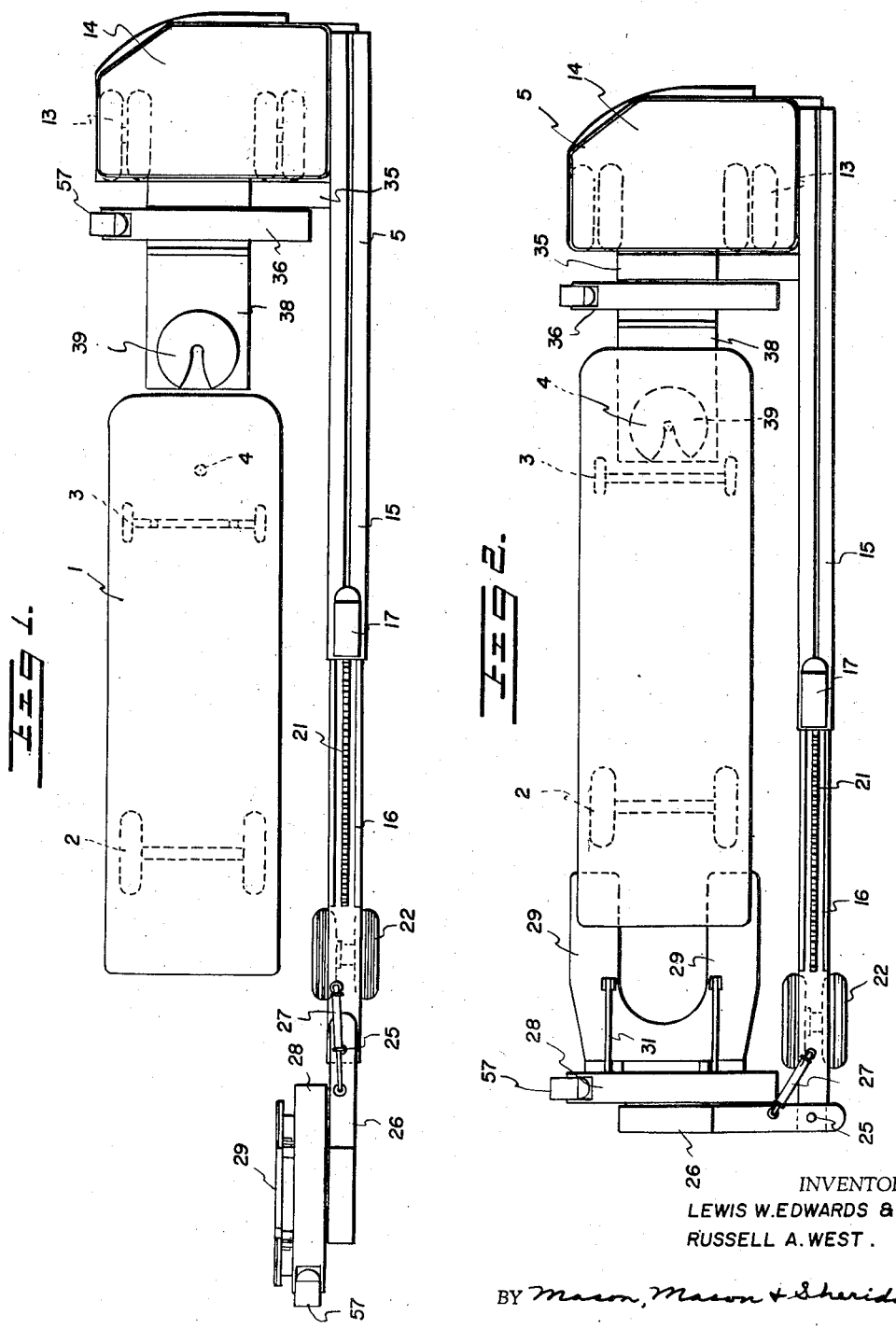

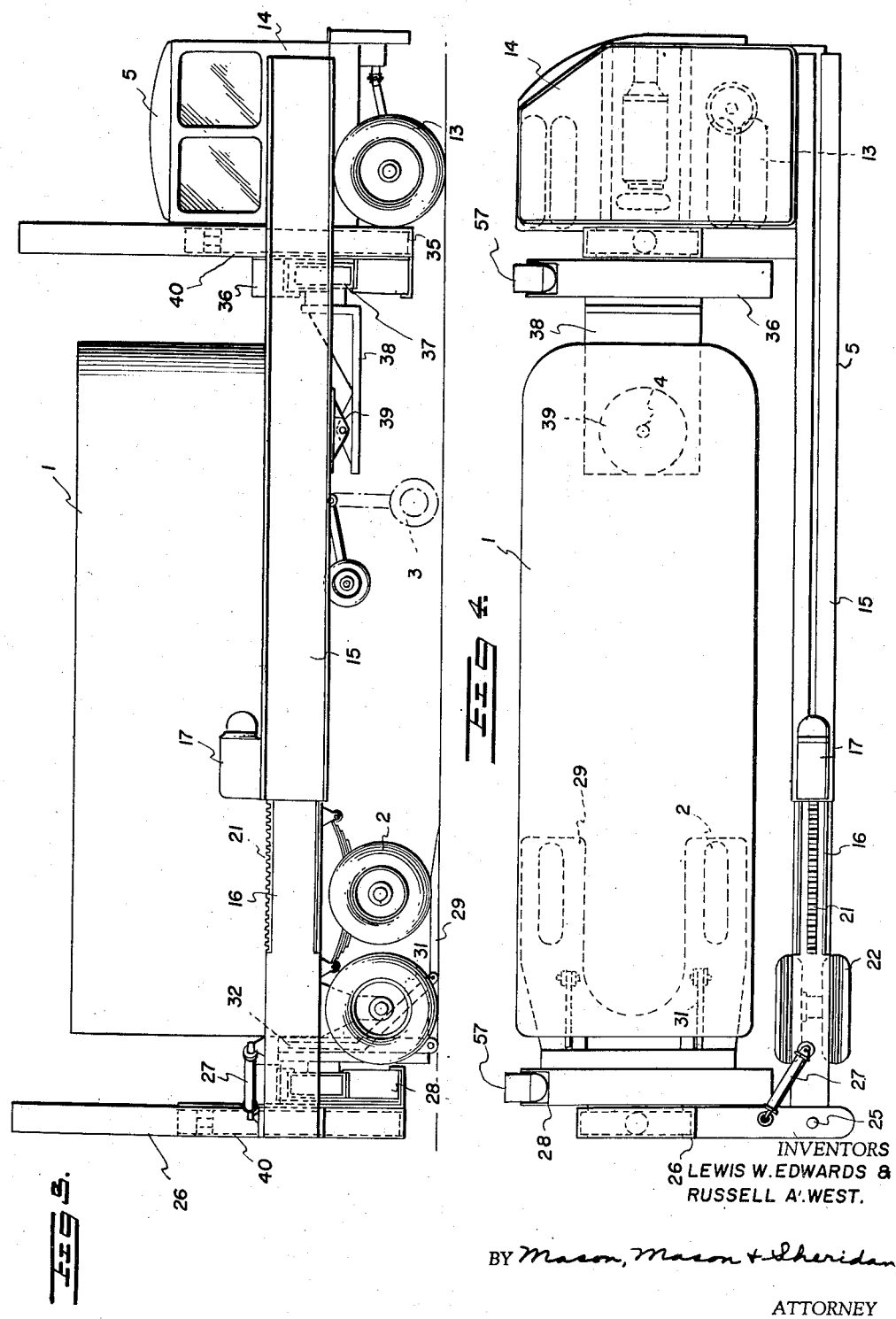

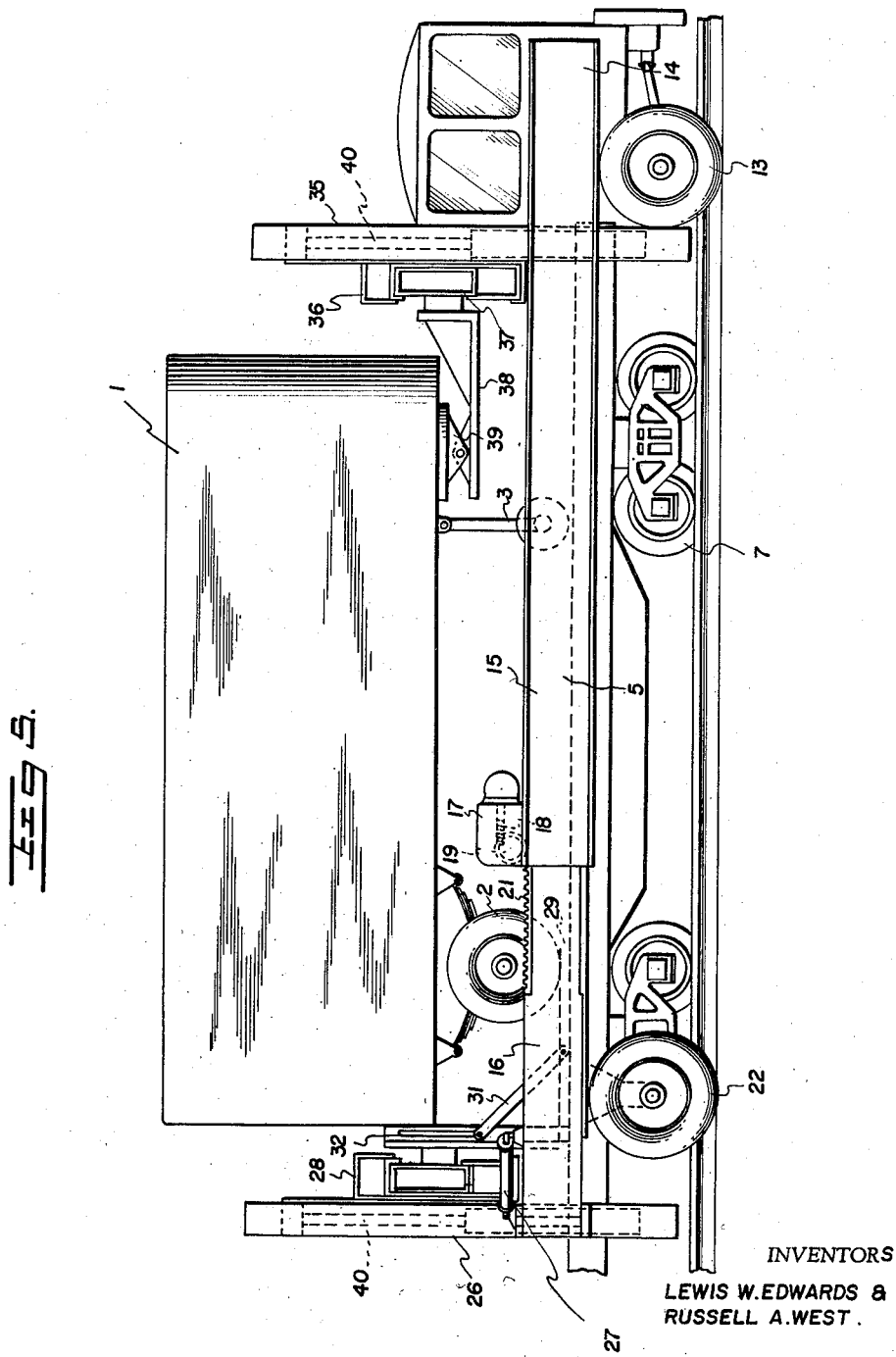

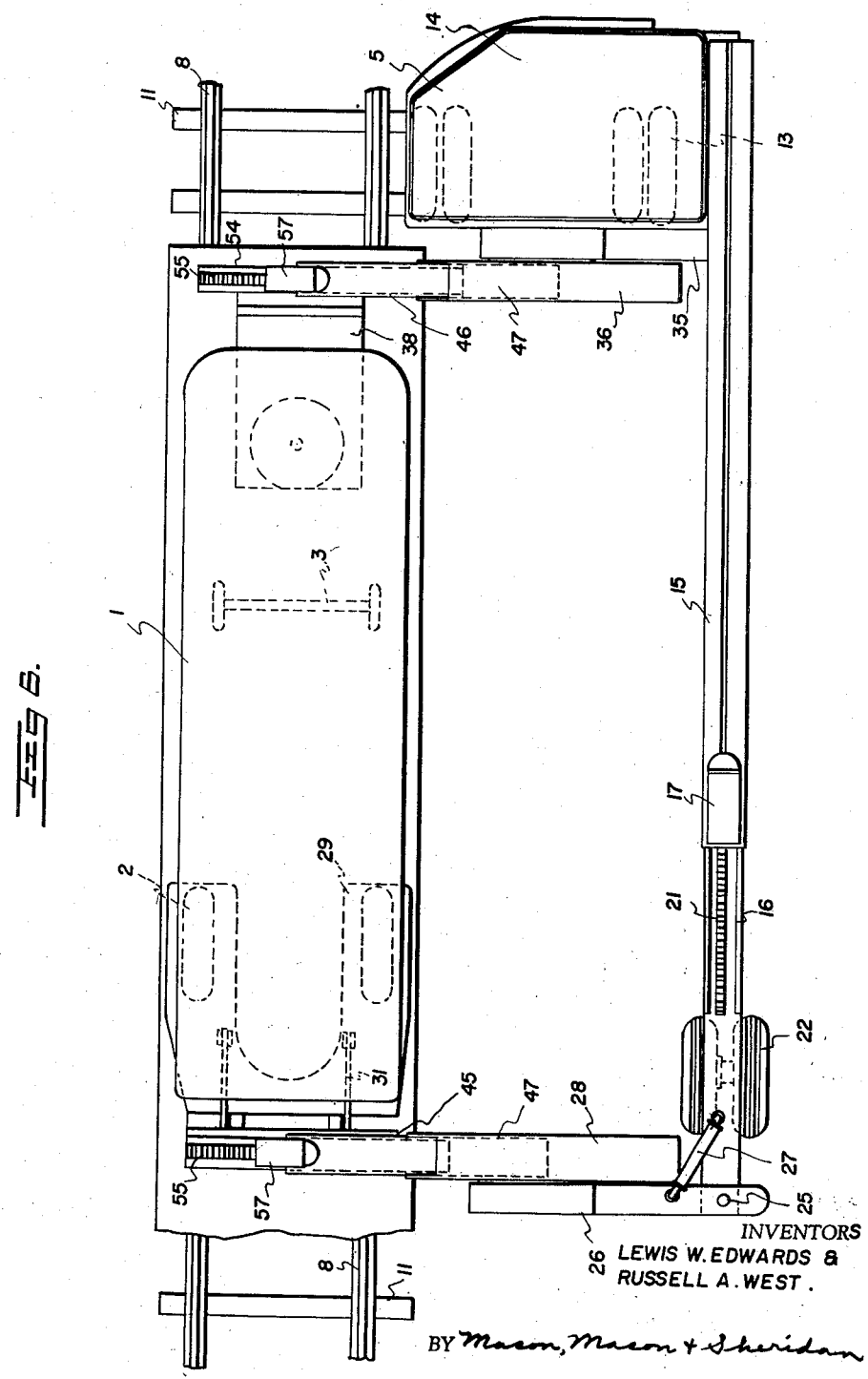

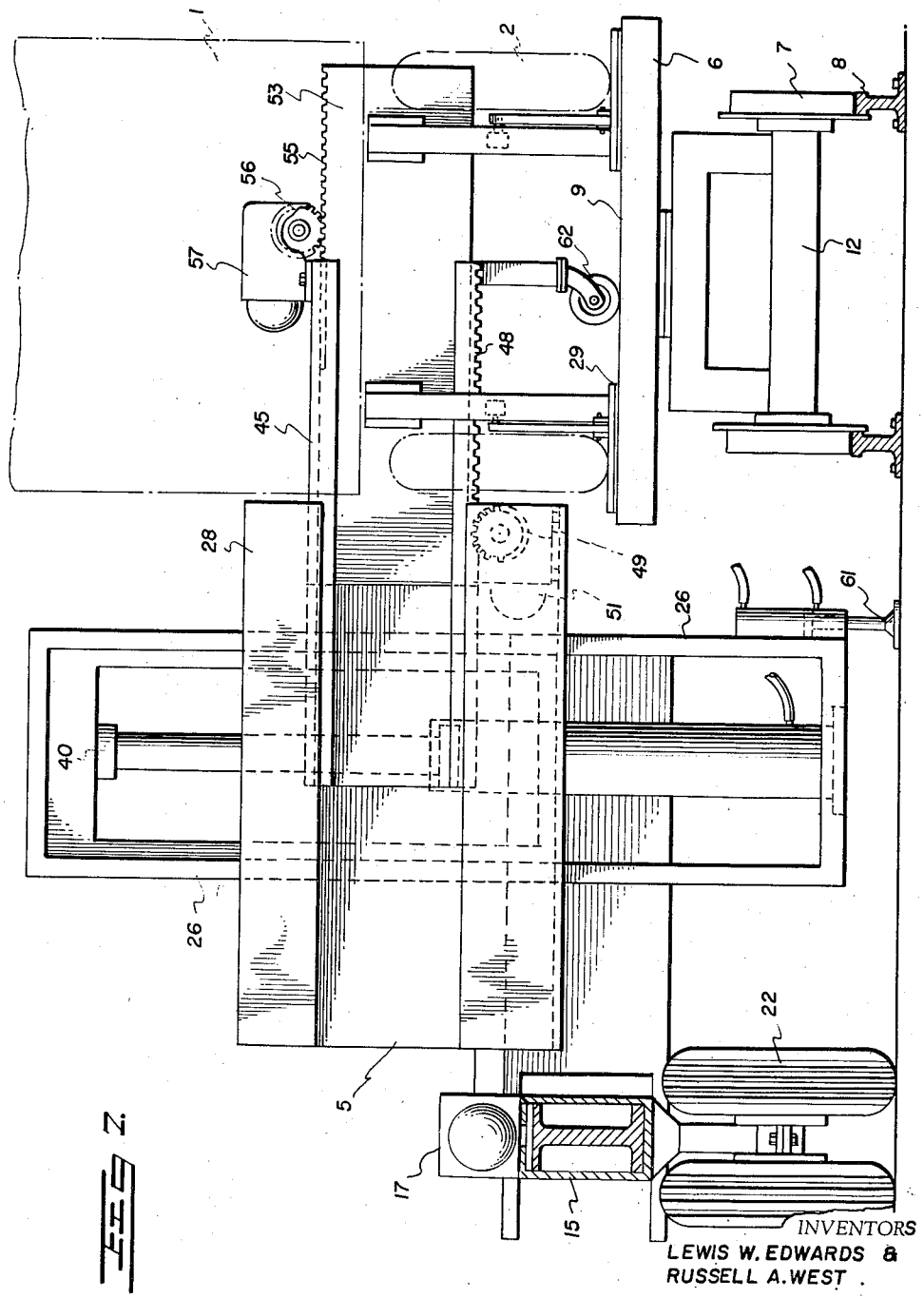

2,773,614

APPARATUS FOR LOADING AND UNLOADING HEAVY EQUIPMENT

Lewis W. Edwards and Russell A. West, Coatesville, Pa., assignors to Lukens Steel Company, Coatesville, Pa., a corporation of Pennsylvania Application January 18, 1954, Serial No. 404,404

10 Claims. (Cl. 214—390)

This invention particularly relates to apparatus for loading and unloading freight-laden trailers onto and from a railway flatcar; although it may be employed generally as a material-handling machine for transporting equipment, such as heavy vehicles, to various locations. Reference is hereby made to our co-pending applications; namely, Serial No. 365,061, filed in the United States Patent Office on June 30, 1953 and entitled "Method and Apparatus for Loading and Unloading Trailers and the Like Onto and From Platforms and the Like," and to Serial No. 392,558, filed in the United States Patent Office on November 17, 1953 and entitled "Method and Apparatus for Loading and Unloading Trailers and the Like," each of these applications disclosing another method and apparatus for performing a similar function, particularly in respect to highway semi-trailers. Although all three machines and methods overcome many of the objections and disadvantages encountered upon loading and unloading freight-laden trailers onto and from railway flatcars, they are individually quite different and distinctive in appearance and operation.

The apparatus and method shall hereinafter be described in connection with its principal intended use; namely, of handling trailers carrying freight by loading and unloading same onto and from railway flatcars, but it is to be understood that the present invention, as will be apparent, is not so limited in operation and use, inasmuch as it is readily adapted for other uses, such as for loading and unloading other heavy vehicles onto a raised platform, for general handling of materials, such as large logs, for transportation of vehicles generally, and for manipulating service equipment, such as tanks.

Freight transportation is a competitive business, and there is continually a need for improved means for wholesale transportation of bulk freight. Most of the transporting systems now in practice in commerce include the use of trailers and motor trucks or tractors for manipulating the trailers over short as well as long distances. Other bulk freight is transported by water, and some is carried by the railroad. The motor truck-trailer is about the most economical and efficient means known for transporting bulk freight short distances, and this is so for many reasons, such as accessibility to the consignor's premises, operating costs, and speed. Also, utilization of automotive truck-trailers where the distance between the consignor's premises and the consignee's premises are of considerable length is common and on the whole, fairly satisfactory. However, the speed, safety, and operating costs for long distance service would be improved considerably if freight-laden trailers were transported by the railroad over the long distance or hauls and by motor trucks for the short or branch hauls. This system would undoubtedly enjoy extensive use if it were not for the difficulty encountered in loading and unloading a trailer onto and from a railway car, the apparatus of the present invention being principally intended to improve and substantially alleviate this condition. Some of the more apparent disadvantages or difficulties are in positioning and maneuvering a trailer at the railroad terminal, unloading of a selected trailer from the railroad car without first unloading all of the trailers on the car or adjoining coupled cars either in front or in the rear of the selected trailer, loading a selected trailer without arranging for prior or future predetermined sequence, loading of additional trailers on coupled cars, and the generally crowded, cumbersome, and confused conditions of railroad yard and terminal operations caused by trailer tractors, trailers, and the loading and unloading equipment. The systems and apparatuses of the U. S. patents to Francis, No. 1,968,196, and Bayerl, No. 2,121,181, are examples of the prior systems available for loading and unloading trailers from railroad cars.

It is an object of this invention to provide apparatus for loading and unloading a highway semi-trailer or the like onto and from a railway flatcar or the like which overcomes the above difficulties and generally facilitates the railroad yard and terminal operations in connection with the loading and unloading and shipment of highway semi-trailers by railroad.

It is another object of this invention to provide apparatus for loading and unloading trailers onto and from a selected one of a plurality of coupled flatcars without the necessity of uncoupling the cars, with a minimum number of operators, with considerable speed and ease, with a minimum amount of time and expense, and without the addition of equipment other than the usual standard railroad and trailer equipment available.

Yet another object of this invention is to provide apparatus or device for loading and unloading heavy vehicles, such as trailers, onto a railway flatcar or the like, wherein the machine may be positioned such that the trailer has its king pin connected to a platform or the like of the machine and its rear wheels resting on ramp members of the machine, the machine having means for elevating the ramp members and the platform whereby the trailer is elevated and said machine having means for moving the ramp members and platform laterally, sidewise, or transversely with respect to the machine body whereby the trailer may be positioned above the surface which is to be loaded or unloaded.

It is also an object of this invention to provide a material-handling apparatus principally adapted for use in manipulating heavy equipment and vehicles which consists of a plurality of power driven parts for operation by a driver of the apparatus and which may pull or push, raise, lower, and move laterally with respect to the apparatus, the transported equipment following the attachment of one or more of the parts to the equipment.

A still further object of this invention is to provide apparatus which may be readily connected to a trailer or the like for pulling or pushing the latter over the ground or other surface, said apparatus having means for adjusting the position of the axle of the rear wheels thereof whereby it is substantially axially aligned with the axle of the trailer rear wheels.

These and other objects and advantages will be more apparent from the following disclosure when taken in conjunction with the drawings, which form a part thereof, and wherein:

Figure 1 is a schematic top plan view of the machine of the present invention, showing the machine in position for engagement with a trailer king pin;

Figure 2 is a schematic top plan view similar to that of Figure 1, but showing the apparatus connected to the trailer king pin;

Figure 3 is a schematic side elevation view of the apparatus showing the trailer positioned on the apparatus;

Figure 4 is a schematic top plan view of the showing in Figure 3;

Figure 5 is another schematic side elevation view of the apparatus with the trailer thereon illustrating the trailer in its elevated position;

Figure 6 is a schematic top plan view of the apparatus with the trailer thereon showing the trailer moved laterally with respect to the machine whereby it is positioned for engagement on the deck of a flatcar, and Figure 7 is a schematic sectional view taken along the lines 7—7 of Figure 6.

In brief, the present invention comprises a loading and unloading machine for semi-trailers and the like having front wheels and rear wheels separated by a telescoping structure and connected in the form of an L, said structure having folding housing members pivoted thereto and ramp means connected for pivotal movement with one of said housings, there also being provided at the rear of the cab portion of the machine a platform or the like containing a fifth wheel unit adapted to be connected with the king pin of the trailer. The ramp means, as well as the fifth wheel unit, is adapted to be elevated in a substantially vertical plane, as well as to be moved laterally with respect to the machine by means of additional telescoping parts. The apparatus or machine also includes conventional drive, transmission, and steering means whereby the entire apparatus may be driven over the ground or other surface and the movable parts of the apparatus are power operated in all respects by an operator manipulating the controls in the cab portion.

The method of loading a highway semi-trailer from the ground onto a railway flatcar by using the present machine comprises the steps of driving the machine to a position adjacent the trailer with a section thereof extending along one side of the trailer, connecting the fifth-wheel unit to the trailer king pin and substantially aligning the axles of the rear wheels of the trailer and machine, operating the machine to push or pull the trailer over the ground to adjacent and along one side of the selected one of a plurality of coupled railway flatcars, thereafter folding the ramp means whereby they rest on the ground adjacent the rear wheels of the trailer, and at this time, the machine is moved to push and position the rear wheels of the trailer on the ramp means. Following this, the trailer is elevated with respect to the ground preferably to a height slightly greater than the top surface of the flatcar deck and, if necessary, the trailer is carried by the machine to the optimum loading position alongside of the flatcar. By means of operating additional controls within the cab portion of the machine, the trailer is now moved laterally with respect to the machine such that it is positioned directly above its intended location on the deck of the flatcar and during the lateral movement, additional support means for the machine may be provided; and following this, the trailer is moved vertically downwardly and its jack-wheels engage the deck of the flatcar. At this time, the fifth-wheel unit is disconnected from the king pin and the rear wheels of the trailer are removed from the ramp means which results in the trailer wheels resting on the flatcar deck, the usual chocks and lashing-down of the trailer on the selected flatcar deck now taking place. In regard to unloading a trailer from a flatcar, the steps would be substantially in reverse to the sequence described above.

Referring to the drawings in detail, numeral 1 represents a highway semi-trailer, preferably laden with freight, the trailer 1 being provided with rear wheels 2 having conventional rear wheel mountings and also support or jack-wheels 3 and king pin 4, the details of wheels 2 and 3 and pin 4, as well as other trailer parts, not being shown or described since they are well known in the art. The apparatus of this invention, generally represented by numeral 5, is illustrated in connection with loading and unloading the trailer 1 onto and from a railroad flatcar 6, shown in Figure 7. The flatcar illustrated has the usual wheels 7 adapted to run on tracks 8 supported by conventional ties 11. The upper face of the deck of the flatcar 6 on which the trailer 1 is to be positioned is represented by numeral 9, and the various supporting structure of the flatcar is shown at 12.

The loading and unloading machine 5 includes pairs of front wheels 13 mounted in the usual manner, a cab portion 14 which functions as counterweight means as will hereinafter be apparent, and the usual transmission, parts and equipment as well as accessories, such as spot light means, some being shown schematically in dotted lines in Figure 4. The various controls for the remaining machine parts are centralized within the cab 14 so they may be manipulated and operated by the machine driver within the cab, the positioning and connection of such equipment within the cab being considered within the skill of a machinist in light of the hereinafter disclosure.

Extending rearwardly from the cab portion 14 at one side is a telescoping structure consisting of members 15 and 16, there being provided suitable means, such as hydraulic or cable means, for extending member 16 with respect to member 15. As shown, a motor 17, adapted to be operated within cab portion 14, is positioned on member 15 for the purpose of rotating, through suitable reducing means, not shown, worm 18, Figure 5, the latter, in turn, driving pinion 19 which meshes with rack 21 on member 16. It can be seen that by means of rack 21, pinion means 19, worm 18 and motor 17, the telescoping members 15 and 16 may be automatically extended or contracted with respect to each other. Supported adjacent the rearward end of member 16 are a pair of wheels 22 having conventional mounting and axle means, the machine taking the form of an L-shape when the parts are as shown in Figure 1.

Numeral 25 represents a fixed pivot on member 16 about which is pivoted for substantially 90° movement a housing 26, the pivotal action from, for example, the position shown in Figure 1 to that of Figure 2, being automatically carried out by actuation of control means within cab portion 14, the control means being connected to any suitable actuating means such as one or more hydraulic operated piston-cylinder arrangements 27. Riding with housing 26 is an additional housing 28 to which are pivotally secured ramp, feet or apron portions 29. The feet 29 are shown in their upright position in Figure 1, and in their downward horizontal or surface-engaging position in Figure 2, the pivotal actuation functioning by any suitable means, such as mechanism, not shown, but controlled within cab portion 14 for causing actuating rods 31 to ride in tracks 32.

Immediately adjacent and rearwardly of the cab portion 14 are secured second housing members 35 and 36, the latter member including an arm or housing portion 54 adapted to be extended sidewise of the machine 5 as will be explained in detail hereinafter. Rigidly secured to portion 54 is a platform or the like 38 having at its rear end a fifth wheel unit 39 of standard construction, adapted to be attached or connected to the king pin 4. The fifth-wheel unit may take the form of the type shown in our co-pending applications wherein the fifth wheel is pivotally mounted on the platform and may be adjusted vertically, the details of the fifth-wheel unit forming no part of this invention.

Following connection of the fifth-wheel unit 39 to the trailer king pin, member 16 is moved longitudinally with respect to member 15 until the axle of wheels 22 is in substantial alignment with the axle of trailer wheels 2. The trailer may then be pushed or pulled over the ground to a desired position for loading, and it is to be noted that wheels 22, due to their being for all practical purposes locked in their adjusted location upon deenergization of motor 17, form with trailer wheels 2 the rear wheels of the combined movable device.

Contained within housing portions 26 and 35 are one or more lifting cylinders, of the pneumatic or hydraulic type, each having the usual cylinder piston and piston rod arrangement as shown in dotted lines by the numeral 40 in Figure 5. Housings 28 and 36 are integral with the actuated part of the cylinder units 40. As illustrated, there is only one lifting cylinder unit in each housing 26 and 35, but it is to be understood that additional units may be employed, and further other arrangements could be employed in place of the lifting cylinders for elevating the various parts, such as a rack and pinion structure. From the above, it can be seen that, upon actuation of the lifting cylinders 40, the ramp means 29 and the platform 38 may be elevated or lowered in a vertical plane.

Referring specifically to Figures 6 and 7, within housings 28 and 36 are double telescoping arrangements. The first of these consists of housing member 45 telescoping within housing 28 and housing member 46 telescoping within housing 36. Suitable means, such as pneumatic or hydraulic cylinder units similar to units 40 may be positioned within housings 28 and 36 for causing this telescoping action. As shown, both the housings 45 and 46 are provided with rack means 48 engageable with pinion means 49, the latter being driven by suitable motor means 51 controlled in the cab portion 14. Arm 53 telescopes within housing 45, as does arm 54 within housing 46 and for causing this telescoping action, there is provided on arms 53 and 54 rack means 55 engaged by pinion means 56, the latter, in turn, being driven by motor means 57 also controlled within cab portion 14. By the various rack, pinion and motor means illustrated, it is clear that housing means 45 and 46 may be moved laterally with respect to housings 28 and 36 respectively, as may arms 53 and 54 with respect to housings 45 and 46 respectively. The platform 38 is rigidly secured and movable with arm 54, while ramp means 29 moves laterally with arm 53.

For additional support during lateral movement of the parts, there is provided on housing 26 a fluid-actuated foot member 61 which is adapted to be engaged with the ground or other surface for support. Also, depending from housing 45, there is provided a swivel support wheel 62 for engagement on the deck of the flatcar and, if desired, arrangements may be provided for elevating wheel 62 as well as member 61 with respect to flatcar deck 9. During lateral movement of the apron 29 and platform 38, the apparatus front and rear wheels 13 and 22 are usually stationary and substantially locked as is foot support 61, but in the event the wheels are moved slightly over the ground, member 61 may be elevated or constructed such that it will skid over the ground.

For the purpose of depicting the operation of the present machine when used in connection with loading a trailer 1 onto a flatcar 6, reference is made to all of the figures shown which are somewhat schematic. Assuming the trailer 1 is positioned on the ground in a railway terminal, apparatus 5 is moved to adjacent the trailer until it assumes the position substantially as shown in Figure 1. The fifth wheel is connected to the king pin and the axle of wheels 22 and 2 substantially aligned whereupon the trailer is pulled over the ground to adjacent and alongside a flatcar deck 9. Thereafter, housings 26 and 28 are folded or pivoted by means of cylinder 27 and the ramp means or feet 29 pivoted until they substantially engage the ground and at this time the apparatus 5 is backed until wheels 2 rest on ramp means 29 as shown in Figures 3 and 4. To elevate the trailer 1, cylinders 40 are operated and the various parts take the position such as shown in Figure 5. The apparatus is then usually maneuvered and operated slightly with the trailer aboard to position the trailer correctly laterally and vertically for loading on a selected flatcar 6, and usually a railway flatcar such as 6 would be coupled at each end to another flatcar, and following this, the foot member 61 is extended to engage the ground, the machine now being substantially locked to prevent movement over the ground.

The operator now energizes motor means 51 and 57 to move the laterally or transversely telescoping structure until it assumes the position as shown in Figure 6, at which time the trailer 1 is positioned vertically above its intended location on the deck 9. By means of lifting units 40, the trailer is now lowered until the jack-wheels 3 and wheel 62 engage the deck 9, whereupon the wheels 2 may be removed from ramp means 29 and the fifth-wheel unit 39 detached from the king pin 4, following which the trailer is lashed down by chains or the like. The apparatus 5 with its various components is now available for maneuvering about the railway terminal for further similar use or for unloading a trailer or the like from a flatcar 6, and in connection with unloading, the steps would be substantially exactly in reverse order to the sequence described above and are not being repeated, as such is deemed obvious from the foregoing description.

It is to be noted that the operations described are all adapted to be controlled by the operator within the cab 14, and these controls are connected to a common panel for the operator's convenience. The cab portion 14 may also include conventional gauging and recording equipment connected with lifting cylinders 40 whereby the trailer may be weighed for tariff purposes. In this connection, it is preferred to provide conventional controls to insure equal lifting of cylinders 40 and thereby maintain the trailer body level during its elevation and similarly conventional controls should be employed to insure equal lateral movement of arms 53 and 54. It has already been mentioned that the present apparatus may be utilized in connection with heavy logs and the like, and it is to be understood that, in such instances, chains or the like would have to be connected with the fifth-wheel unit and secured to the ramp means.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates. For example, instead of the fifth-wheel unit 39 which is adapted to be connected to the king pin 4, other means, such as a lifting fork adapted to engage and lift the undersurface of the bottom of the trailer body or other type of equipment being loaded or unloaded, may be employed and the same applies in connection with ramp means 29.

We claim:

1. Apparatus for lifting semi-trailers or the like from the ground onto a platform such as the deck of a railway flatcar, comprising a frame mounted on wheels and adapted to be power driven over the ground, said frame having a front portion and a portion extending rearwardly therefrom in the form of a substantial L, said rearwardly extending portion consisting of first and second members connected in telescoping fashion, first housing portions foldably and pivotally mounted on said second member, second housing portions connected to the frame front portion, telescoping sections within one of said first and second housing portions, a ramp-like member pivoted to one of the sections in one of said first housing portions and a fifth-wheel unit adapted to be connected to the king pin of the trailer mounted integrally on one of the sections in one of said second housing portions, means including lifting means associated with the first and second housing portions for elevating the ramp member and fifth-wheel unit as well as the trailer when the unit is connected to the king pin and the trailer rear wheels are on the ramp member, means for actuating the lifting means, and means for causing telescoping action of the members of the rearwardly extending portion and the telescoping sections whereby, when the latter occurs, the ramp member and fifth-wheel unit are moved laterally of the frame.

2. Apparatus as defined in claim 1 wherein there is provided additional support means associated with said first housing portions adapted to be lowered to engage the ground during lateral movement of the ramp member and fifth-wheel unit.

3. Apparatus as defined in claim 1 wherein the rear wheels of the apparatus are mounted on the second member such that their axle mounting may be positioned in substantial axial alignment with the axle of the trailer rear wheels when the fifth-wheel unit is connected to the trailer king pin.

4. Material handling apparatus comprising a main body mounted on wheels and adapted to be power driven over the ground, said body having a front portion and a second portion extending rearwardly therefrom, a member foldably and pivotally connected with said second portion and a member connected with said front portion, a support for the material connected to each of said members, means to elevate and lower each member and its support with respect to the body, and means to move each member and its support laterally of the body.

5. Apparatus as defined in claim 4 wherein said last named means includes telescoping each member within other sections connected to said portions.

6. Apparatus as defined in claim 4 wherein one of said supports comprises a ramp-like member pivoted to the foldably mounted member and there is provided means for pivoting said ramp-like member from a substantially vertical position to a horizontal position and vice versa.

7. Apparatus as defined in claim 6 wherein the other of said supports comprises a fifth wheel unit adapted to be connected to the king pin of a trailer.

8. Lifting apparatus comprising a main body mounted on wheels and adapted to be power driven over the ground, said body having a front portion and a portion extending rearwardly therefrom, first housing means foldably and pivotally mounted on said last named portion, second housing means connected to the front portion, telescoping sections within each of said housing means, a support for material to be lifted connected to one of the sections associated with the first housing means and another support for the material connected to one of the sections associated with the second housing means, lifting means associated with both housing means for elevating and lowering the supports with respect to the main body, means for actuating said lifting means, and means for causing telescoping action of said sections to cause movement of said supports laterally of the main body.

9. Lifting apparatus as defined in claim 8 wherein said rearwardly extending portion consists of first and second members connected in telescoping fashion and means is provided for causing telescoping action of said members whereby the distance between said supports may be varied.

10. Lifting apparatus as defined in claim 8 wherein there is provided additional support means associated with said first housing means adapted to engage the ground during lateral movement of said supports for the material.

References Cited in the file of this patent

UNITED STATES PATENTS

| | | |
|---|---|---|
| 1,410,103 | Lightner et al. | Mar. 21, 1922 |
| 1,828,308 | Been | Oct. 20, 1931 |
| 1,903,274 | Watson | Mar. 28, 1933 |
| 2,324,817 | Bratley | July 20, 1943 |
| 2,536,068 | Lehmann | Jan. 2, 1951 |
| 2,621,812 | Lull | Dec. 16, 1952 |
| 2,647,647 | Alimanestiano | Aug. 4, 1953 |
| 2,667,980 | Dawson | Feb. 2, 1954 |

FOREIGN PATENTS

| | | |
|---|---|---|
| 614,572 | Germany | June 13, 1935 |

OTHER REFERENCES

Publication, Newsweek, March 31, 1952, p. 42, Mechanic Illustrated, October 1952, p. 89.